(12) United States Patent
Nagase et al.

(10) Patent No.: US 12,481,100 B2
(45) Date of Patent: Nov. 25, 2025

(54) OPTICAL DEVICE AND OPTICAL MODULATOR

(71) Applicant: TDK CORPORATION, Tokyo (JP)

(72) Inventors: Kenji Nagase, Hong Kong (CN); Hiroshi Take, Hong Kong (CN); Anthony Reymund Melad Binarao, Hong Kong (CN); Cheng Bu Heng, Hong Kong (CN)

(73) Assignee: TDK CORPORATION, Tokyo (JP)

( * ) Notice: Subject to any disclaimer, the term of this patent is extended or adjusted under 35 U.S.C. 154(b) by 302 days.

(21) Appl. No.: 18/191,050

(22) Filed: Mar. 28, 2023

(65) Prior Publication Data

US 2023/0314710 A1 Oct. 5, 2023

(30) Foreign Application Priority Data

Mar. 31, 2022 (CN) .......................... 202210330419.8

(51) Int. Cl.
*G02B 6/12* (2006.01)
*G02B 6/125* (2006.01)

(52) U.S. Cl.
CPC ...... *G02B 6/125* (2013.01); *G02B 2006/1204* (2013.01); *G02B 2006/12097* (2013.01)

(58) Field of Classification Search
CPC .................. G02B 2006/1204; G02B 2006/122
See application file for complete search history.

(56) References Cited

U.S. PATENT DOCUMENTS

| 7,343,055 B2 * | 3/2008 | McBrien ............... G02F 1/0356 385/2 |
| 2003/0026515 A1 * | 2/2003 | Barenburg ......... G02B 6/12004 385/24 |
| 2005/0175271 A1 | 8/2005 | Sugiyama et al. |
| 2006/0098928 A1 * | 5/2006 | Koch .................... G02B 6/132 385/129 |
| 2020/0041824 A1 † | 2/2020 | Ohmori |
| 2020/0105986 A1 * | 4/2020 | Kato ................. H01L 23/49582 |

(Continued)

FOREIGN PATENT DOCUMENTS

| EP | 3919949 A1 * | 12/2021 | ......... G02B 6/12007 |
| GB | 2399304 A * | 9/2004 | ............. C23C 18/04 |

(Continued)

OTHER PUBLICATIONS

S. Abe et al., ""Photonic integration based on a ferroelectric thin-film platform"", Sci. Reports 9 (2019) 16548.†

(Continued)

*Primary Examiner* — Charlie Y Peng
(74) *Attorney, Agent, or Firm* — Oliff PLC

(57) ABSTRACT

An optical device and an optical modulator, the optical device includes an optical waveguide, at an surface of plate-like or film-like electro-optic material forming the optical waveguide, 3 locations are selected in the extension direction of the optical waveguide, and 2 locations are selected in the width direction of the optical waveguide in a range of a region of 0.1×0.1 μm, and for a total of 6 locations, an surface roughness RMS is measured with Atomic Force Microscope, and an average of the RMS is 5.1 nm or less.

10 Claims, 3 Drawing Sheets

(56) References Cited

U.S. PATENT DOCUMENTS

2021/0157177 A1\* 5/2021 Kharel .................. G02F 1/0316
2021/0325760 A1† 10/2021 Makino

FOREIGN PATENT DOCUMENTS

| JP | H05-273418 | † | 10/1993 | | |
| JP | 2005-221874 | A | 8/2005 | | |
| JP | 2006-195383 | A | 7/2006 | | |
| JP | 2023153048 | A | \* 10/2023 | ............... | G02F 1/03 |

OTHER PUBLICATIONS

J. P. George et al., "Lanthanide-Assisted Deposition of Strongly Electro-optic PZT Thin Films on Silicon: Toward Integrated Active Nanophotonic Devices", ACS Appl. Mater. Interfaces 7 (2016) 13350.†

R. Wu et al., "Long Low-Loss-Lithium Niobate on Insulator Waveguides with Sub-Nanometer Surface Roughness", Nanomaterials 8 (2018) 910.†

N. A. Feidenshans'l et al., Meas. Sci. Technol. 26 (2015) 085208.†

\* cited by examiner
† cited by third party

OPTICAL DEVICE AND OPTICAL MODULATOR

FIELD OF THE INVENTION

The present invention relates to an optical device and an optical modulator used in the fields of optical communication and optical measurement.

BACKGROUND OF THE INVENTION

Communication traffic has been remarkably increased with widespread Internet use, and optical fiber communication is becoming significantly important. The optical fiber communication is a technology that converts an electric signal into an optical signal and transmits the optical signal through an optical fiber and has the characteristics of wide bandwidth, low loss, and resistance to noise.

As a method for converting an electric signal into an optical signal, a direct modulation method using a semiconductor laser and an external modulation method using an optical modulator are known. The direct modulation method does not require the optical modulator and is low in cost, but there are limits to high-speed modulation. On the other hand, the external modulation method is used for high-speed and long-distance applications.

As the optical modulator, a Mach-Zehnder optical modulator in which an optical waveguide is formed by Ti (titanium) diffusion in the vicinity of the surface of a single-crystal lithium niobate substrate has been practically used (see, Patent Document 1). The Mach-Zehnder optical modulator is an optical modulator that uses an optical waveguide (Mach-Zehnder optical waveguide) having a Mach-Zehnder interferometer structure. The Mach-Zehnder interferometer is a device that separates light emitted from one light source into two beams, makes the two beams pass through different paths, and then recombines the two beams to cause interference, and the Mach-Zehnder optical modulator applying the Mach-Zehnder interferometer is used for generating various modulated lights. Although high-speed optical modulators having a modulation speed of 40 Gb/s or more are commercially available, they have a major drawback that the entire length thereof is as long as about 10 cm.

In contrast, Patent Document 2 discloses a Mach-Zehnder optical modulator using a lithium niobate film. The optical modulator using the lithium niobate film (LN film) achieves significant reduction in size and has a lower driving voltage than an optical modulator using a lithium niobate single crystal substrate. In Patent Document 2, by the step of forming the LN film at the substrate and the step of etching the LN thin film and forming the optical waveguide at the substrate, sufficient light confinement effect is obtained so that the operation speed of the electro-optical device is speed up.

In the optical waveguide using the LN film, it is important to confine the entry of light so as to reduce the driving voltage. Thus, the LN film quality and the adhesion with the protective layer must be emphasized to avoid micro-cracks on the LN film.

For example, silicon oxide with a low refractive index as the protective layer is formed adjacent to the LN film as the optical waveguide. Thereby, the influence of stress caused by the different coefficients of expansion between the LN film and the material constituting the protective layer may cause the light propagation loss.

CITATION LIST

Patent Document

Patent Document 1: JP 2005-221874A
Patent Document 2: JP 2006-195383A

SUMMARY OF THE INVENTION

The present invention is completed in view of the above problems, and its object is to provide an optical device with small light propagation loss.

One embodiment of the present invention is an optical device comprising an optical waveguide, wherein, at the surface of the plate-like or film-like electro-optic material forming the optical waveguide, 3 locations are selected in the extension direction of the optical waveguide, and 2 locations are selected in the width direction of the optical waveguide in a range of a region of 0.1×0.1 µm, and for a total of 6 locations, an surface roughness RMS is measured with Atomic Force Microscope, and an average of the RMS is 5.1 nm or less.

According to the optical device of the present invention, by roughening the optical waveguide, the influence of stress due to the difference in expansion coefficient between the optical waveguide material and the protective layer can be reduced, and the occurrence of micro-cracks at the optical waveguide can be further suppressed, thereby reducing the light propagation loss. In addition, the surface roughness can be measured correctly by measuring the RMS at multiple points in the range of 0.1×0.1 µm.

In addition, in the optical device of the present invention, preferably, among the 6 locations, the deviation of the maximum value and minimum value of the RMS from the average is within ±1.2 nm.

In addition, in the optical device of the present invention, preferably, the shape of the optical waveguide is a ridged shape, and the average of the RMS of an side surface of the optical waveguide is larger than the average of RMS of an upper surface of the optical waveguide.

In addition, in the optical device of the present invention, preferably, the ratio of the average of RMS of the side surface of the optical waveguide to the average of RMS of the upper surface of the optical waveguide ([RMS (side surface)]/[RMS (upper surface)]) is 1.05~1.1.

In addition, in the optical device of the present invention, preferably, a metal oxide layer is provided on the optical waveguide.

In addition, in the optical device of the present invention, preferably, the electro-optical material is formed of $LiNbO_3$.

In addition, in the optical device of the present invention, preferably, the electro-optical material is material formed of $LiNbO_3$ doped with at least Ti.

In addition, in the optical device of the present invention, preferably, the electro-optical material is an epitaxial film.

In addition, in the optical device of the present invention, preferably, the epitaxial film is orientated in a direction crossing the substrate.

Another embodiment of the present invention is an optical modulator, comprising an optical waveguide and an electrode, at the surface of the plate-like or film-like electro-optic material forming the optical waveguide, 3 locations are selected in the extension direction of the optical waveguide, and 2 locations are selected in the width direction of the optical waveguide in the range of the region of 0.1×0.1 µm, and for a total of 6 locations, an surface roughness RMS is measured with Atomic Force Microscope, and an average of the RMS is 5.1 nm or less.

In addition, in the optical modulator of the present invention, preferably, the shape of the optical waveguide is a ridged shape, and the average of RMS of side surfaces of the optical waveguide is larger than the average of RMS of upper surface of the optical waveguide, and the electrode is provided above the optical waveguide with the ridged shape.

Advantageous Effects of the Invention

According to the optical device and the optical modulator with the optical device of the present invention, the light propagation loss can be reduced effectively.

BRIEF DESCRIPTION OF THE DRAWINGS

FIG. 1(b) illustrates the entire configuration of the optical modulator 100 including the optical device illustrated in FIG. 1(a) and traveling wave electrodes.

DETAILED DESCRIPTION

Hereinafter, embodiments of the present invention will be described in detail with reference to the accompanying drawings.

<Structure of the Optical Device>

Figure 1A:
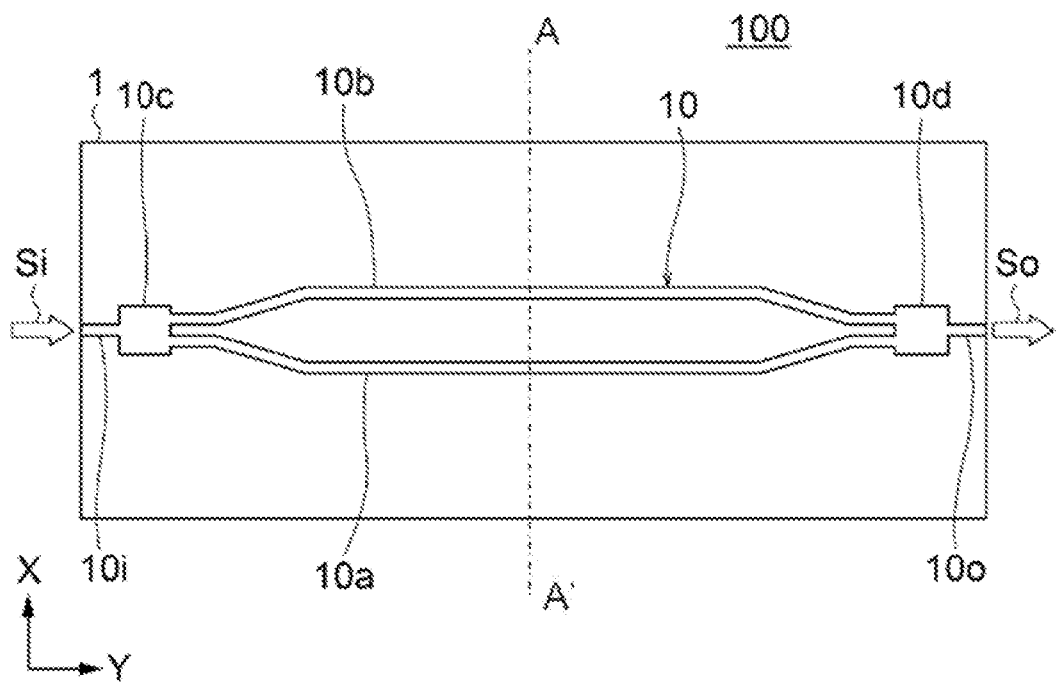
FIG. 1(a) and FIG. 1(b) are top views illustrating the optical modulator 100 with the optical device of the first embodiment of the present invention, in which FIG. 1(a) only illustrates the optical waveguide.
Figure 1B:
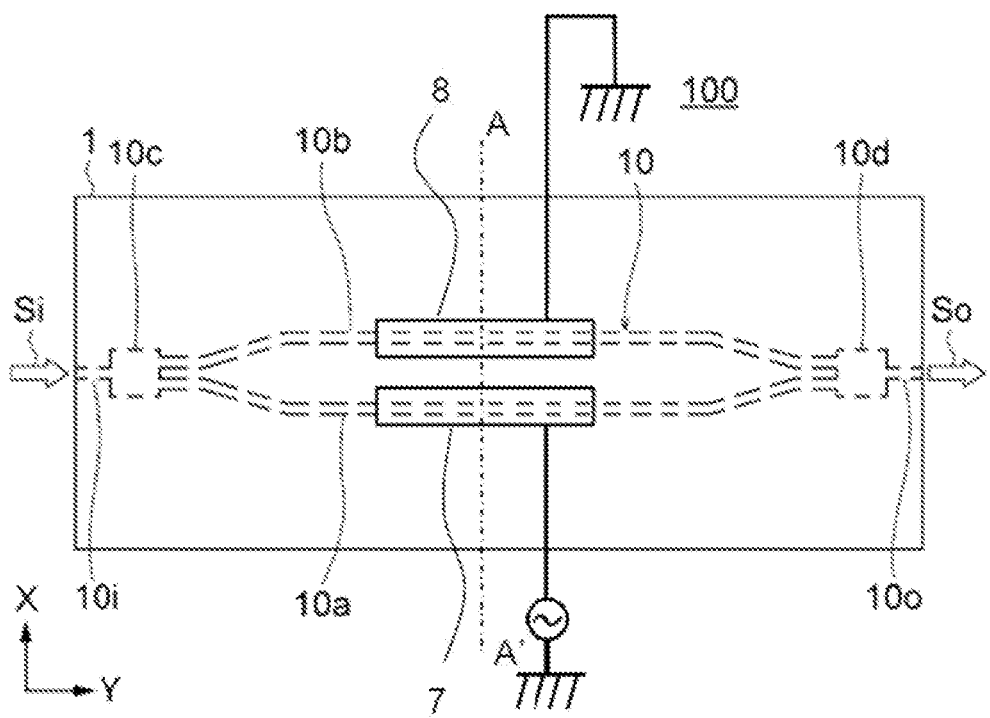

FIG. 1(a) and FIG. 1(b) are top views illustrating the optical modulator 100 with the optical device of the first embodiment of the present invention, in which FIG. 1(a) only illustrates the optical waveguide, and FIG. 1(b) illustrates the entire configuration of the optical modulator 100 including the optical device illustrated in FIG. 1(a) and traveling wave electrodes.

As illustrated in FIG. 1(a), the optical device included in the optical modulator 100 comprises: a Mach-Zehnder optical waveguide 10, provided with first and second optical waveguides 10a and 10b formed at the substrate 1 and arranged in parallel with each other, and as illustrated in FIG. 1(b), the optical modulator 100 further comprises: a first electrode 7 provided along the first optical waveguide 10a, and a second electrode 8 provided along the second optical waveguide 10b.

The Mach-Zehnder optical waveguide 10 is an optical waveguide having a structure of Mach-Zehnder interferometer. It is provided with the first and the second optical waveguides 10a and 10b branched from one input optical waveguide 10i at a demultiplexing section 10c, and the first and the second optical waveguides 10a and 10b are combined into one output optical waveguide 10o at a multiplexing section 10d. After the input light Si is demultiplexed at the demultiplexing section 10c and travels through the first and the second optical waveguides 10a and 10b, respectively, it is multiplexed at the multiplexing section 10d and output from the output optical waveguide 10o as modulation light So.

The first electrode 7 covers the first optical waveguide 10a in the top view, and the second electrode 8 covers the second optical waveguide 10b in the top view in the same way. In other words, the first electrode 7 is formed above the first optical waveguide 10a via the protective layer (to be described later), and the second electrode 8 is formed above the second optical waveguide 10b via the protective layer in the same way. The first electrode 7 is connected to, for example, an AC signal, and it can be referred to as a "signal electrode". The second electrode 8 is connected to, for example, the ground, and it can be referred to as a "ground electrode".

The electric signal (the modulation signal) is input to the first electrode 7. Since the first optical waveguide 10a is composed of materials with electro-optical effects such as lithium niobate etc., according to the electric field applied to the first optical waveguide 10a, the refractive index of the first optical waveguide 10a changes as +Δn and −Δn, and the phase difference between a pair of optical waveguides changes. The signal light modulated by the change of the phase difference is output from the output optical waveguide 10o.

Figure 2:
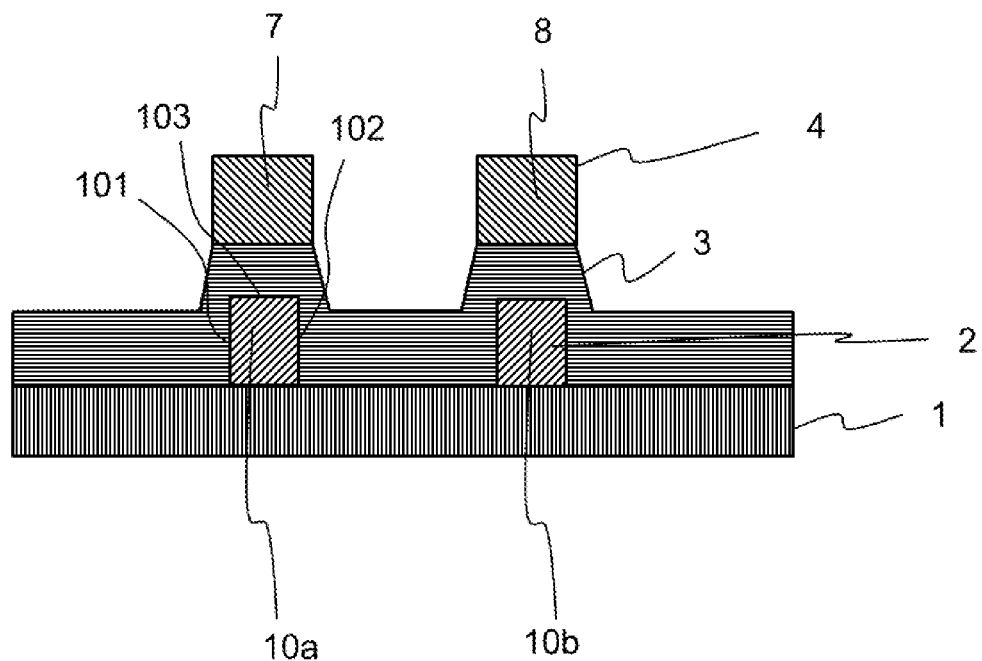
FIG. 2 is an illustrative cross-sectional view of the optical modulator 100 taken along line A-A' of FIG. 1(b).

FIG. 2 is an illustrative cross-sectional view of the optical modulator 100 taken along line A-A' of FIG. 1(b).

As illustrated in FIG. 2, the optical modulator 100 of the present embodiment is provided with at least a multilayer structure in which a substrate 1, an optical waveguide 2, a protective layer 3 and an electrode layer 4 are laminated in this order. The substrate 1 is, for example, a sapphire substrate, and the optical waveguide 2 formed of the lithium niobate film is formed at the surface of substrate 1. The Mach-Zehnder optical waveguide 10 comprise light-propagation first and second optical waveguides 10a and 10b. The width of the first and second optical waveguides 10a and 10b can be, for example, 1 μm.

To prevent the light propagating through the first and second optical waveguides 10a and 10b from being absorbed by the first electrode 7 or the second electrode 8, the protective layer 3 is formed adjacent to the optical waveguide 2, and it is at least formed at the first and second optical waveguide 10a and 10b of the Mach-Zehnder optical waveguide 10. Thus, the protective layer 3 only needs to function as an intermediate layer between the optical waveguide and the signal electrode, and the material of the protective layer 3 can be widely selected. For example, the protective layer 3 can be made of a non-metal oxide such as silicon oxide, a metal oxide such as alumina, a metal nitride, a metal carbide, a resin material such as polyimide, or an insulating material such as ceramics. The material of the protective layer 3 can be a crystalline material or an amorphous material. The protective layer 3 is preferably formed of a material with a lower refractive index than the optical waveguide 2, such as, $Al_2O_3$, $SiO_2$, $LaAlO_3$, $LaYO_3$, ZnO, $HfO_2$, MgO, $Y_2O_3$ etc. The thickness of the protective layer 3 formed at the optical waveguide is approximately 0.2~1.2 μm. In this embodiment, the protective layer 3 not only covers the upper surface of the first and second optical waveguides 10a and 10b, but also is filled between the first and second optical waveguides 10a and 10b. In other words, the protective layer 3 is also formed at the area that does not overlap with the first and second optical waveguides 10a and 10b in the top view. The protective layer 3 also covers the substrate 1 on which the optical waveguide 2 is not formed, and the side surfaces of the first and second optical waveguides 10*a* and 10*b* are also covered by the protective layer 3, so that the scattering loss due to the roughening of the side surfaces of the first and second optical waveguides 10*a* and 10*b* can be reduced as described later.

The electrode layer 4 is provided with the first electrode 7 and the second electrode 8. The first electrode 7 is opposite to the first optical waveguide 10*a* via the protective layer 3 so as to modulate the light traveling in the first optical waveguide 10*a*. The second electrode 8 is at least opposite to the second optical waveguide 10*b* via the protective layer 3 so as to modulate the light traveling in the second optical waveguide 10*b*.

As illustrated in FIG. 2, the first optical waveguide 10*a* and the second optical waveguide 10*b* are arranged in order in the direction perpendicular to the direction of light propagation. The first electrode 7 and the second electrode 8 are provided on the first optical waveguide 10*a* and the second optical waveguide 10*b* via the protective layer 3. Thus, the stress applied to the optical waveguides 10*a* and 10*b* from the protective layer 3 can be reduced, the occurrence of cracks on the optical waveguides 10*a* and 10*b* can be suppressed, thereby improving the reliability and reducing the optical propagation loss.

Since the optical waveguide 2 is not particularly limited as long as it is made of an electro-optic material, the film forming the optical waveguide 2 may be called an electro-optic material film. However, the optical waveguide 2 is preferably composed of lithium niobate ($LiNbO_3$). This is because lithium niobate has a large electro-optical constant and is suitable as a constituent material of optical devices such as optical modulators. The optical waveguide 2 may also be composed of lithium tantalate ($LiTaO_3$). In addition, when the optical waveguide 2 is composed of lithium niobate, other elements may also be doped, for example, lithium niobate may be doped with at least one selected from Ti, Mg, Zn, In, Sc, Er, Tm, Yb, and Lu. Hereinafter, the structure of the present embodiment when the optical waveguide 2 is a lithium niobate film will be described in detail.

The substrate 1 is not particularly limited as long as it has a lower refractive index than the lithium niobate film, but it is preferable a substrate on which a lithium niobate film can be formed as an epitaxial film, and a sapphire single crystal substrate or a silicon single crystal substrate is preferable. The crystal orientation of the single crystal substrate is not particularly limited. The lithium niobate film has properties such as being easily formed as a c-axis-oriented epitaxial film with respect to single crystal substrates of various crystal orientations. Since the c-axis oriented lithium niobate film has three-fold symmetry, it is desirable that the underlying single crystal substrate also has the same symmetry. In the case of a sapphire single crystal substrate, a c-plane substrate is preferred, and in the case of a silicon single crystal substrate, a (111) plane substrate is preferred.

Here, the epitaxial film is a film oriented in alignment with the crystal orientation of the underlying substrate or underlying film. When the film plane is defined as the XY plane and the film thickness direction is defined as the Z axis, the crystals are aligned and oriented along the X, Y and Z axes. For example, the epitaxial film can be verified by first confirming the intensity at the orientation position by 2θ-θ X-ray diffraction and secondly confirming the pole.

Specifically, first, when measurement is performed by 2θ-θ X-ray diffraction, the peak intensity of all peaks other than the target surface is 10% or less, preferably 5%, of the maximum peak intensity of the target surface. For example, in a c-axis oriented epitaxial film of lithium niobate, the peak intensity of planes other than the (00L) plane is 10% or less, preferably 5% or less of the maximum peak intensity of the (00L) plane. (00L) is a generic term for equivalent planes such as (001) and (002).

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single-crystal $LiNbO_3$ (014) has 3 poles. For the lithium niobate film, it is known that crystals rotated by 180° about the c-axis are epitaxially grown in a symmetrically-coupled twin crystal state. In this case, three poles are symmetrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The thickness of the lithium niobate film is preferably 2 μm or less, and it is preferably 1.2 μm. This is because if the film thickness is thicker than 2 μm, it is difficult to form a film with high quality. On the other hand, while the film thickness of the lithium niobate film is too thin, the restriction of light in the lithium niobate film becomes weaker and light may leak to the substrate 1 or the protective layer 3. Even if an electric field is applied to the lithium niobate film, there is a concern that the change in the effective refractive index of the first and second optical waveguides 10*a* and 10*b* becomes smaller. Therefore, the lithium niobate film preferably has a film thickness of about 1/10 or more of the wavelength of the used light or more.

It is desirable to form the lithium niobate film by a film forming method such as sputtering, CVD or sol-gel process. Application of an electric field along the c-axis perpendicular to the main surface of the single-crystal substrate 1 can change the optical refractive index in proportion to the electric field. In the case of the single-crystal substrate made of sapphire, the lithium niobate film can be directly epitaxially grown on the single-crystal sapphire substrate. In the case of the single-crystal substrate made of silicon, the lithium niobate film is epitaxially grown on a clad layer (not shown). The clad layer (not shown) has a lower refractive index than the lithium niobate film and should be suitable for epitaxial growth. For example, a high-quality lithium niobate film can be formed on a clad layer (not shown) made of $Y_2O_3$.

In addition, as a formation method for the lithium niobate film, a method of thinly polishing or slicing the lithium niobate single crystal substrate is known. This method has the advantage of obtaining the same characteristics as single crystals, and can be applied to the present invention.

Figure 3:
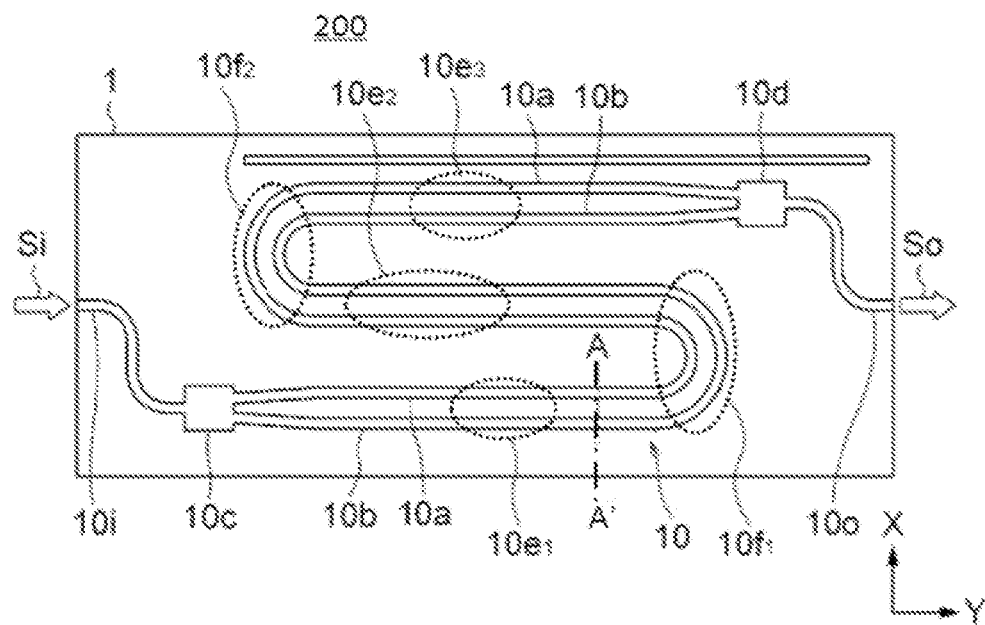
FIG. 3 is a view illustrating the optical modulator 200 with the optical device of the second embodiment of the present invention.

FIG. 3 is a view illustrating the optical modulator 200 with the optical device of the second embodiment of the present invention.

As shown in FIG. 3, the optical modulator 200 of the second embodiment is characterized in that the Mach-Zehnder optical waveguide 10 is composed of a combination of straight line portions and curved portions. More specifically, the Mach-Zehnder optical waveguide 10 comprises: the first to the third straight line portions 10*e*$_1$, 10*e*$_2$ and 10*e*$_3$ configured in parallel with each other; the first curved portion 10*f*$_1$ connecting the first straight line portion 10*e*$_1$ and the second straight line portion 10*e*$_2$; and the second curved portion $10f_2$ connecting the second straight line portion $10e_2$ and the third straight line portion $10e_3$.

Thus, in the optical modulator 200 of this embodiment, the cross-sectional structure of the straight line portions $10e_1$, $10e_2$ and $10e_3$ of the Mach-Zehnder optical waveguide 10 along the line A-A' in FIG. 3 is constituted to become the cross-sectional structure shown in FIG. 2. That is, the first electrode 7 covers the first optical waveguide 10a in the first to third straight line portions $10e_1$, $10e_2$ and $10e_3$ via the protective layer 3, and in addition the second electrode 8 covers the second optical waveguide 10b in the first to third straight line portions $10e_1$, $10e_2$ and $10e_3$ via the protective layer 3. Preferably, the first electrode 7 and the second electrode 8 cover the entirety of the first to third straight line portions $10e_1$, $10e_2$, $10e_3$, however, for example, it is also possible to only cover the first straight line portion $10e_1$.

In this embodiment, the input light Si is input to one end of the first straight line portion $10e_1$ and travels from one end of the first straight line portion $10e_1$ to the other end, and turns back at the first curved portion $10f_1$ and travels from one end of the second straight line portion $10e_2$ to the other end in a direction opposite to the travelling direction in the first straight line portion $10e_1$, and turns back at the second curved portion $10f_2$ and travels from one end of the third straight line portion $10e_3$ to the other end in the same direction as the traveling direction in the first straight line portion $10e_1$.

In optical modulators, it is a big problem in actual work that the element length is too long. However, according to forming the optical waveguide by bending it back as shown in figures, the element length can be largely decreased and notable effects can be obtained. In particular, the optical waveguide formed of the lithium niobate film has the feature that the loss is still small even if the radius of curvature is reduced to, for example, about 50 μm, and is suitable for this embodiment.

<Surface Roughness of the Optical Waveguide>

Next, a method for roughening the surface of the optical waveguide will be described. An example in which the side surfaces of the optical waveguides 10a and 10b in the optical modulator 100 of the first embodiment are roughened will be described below.

As illustrated in FIG. 2, the first and second optical waveguides 10a and 10b respectively have two side surfaces 101 and 102 that are substantially perpendicular to the substrate 1 and an upper surface 103. Herein, the two side surfaces 101 and 102 are not limited to be perpendicular to the substrate 1, and they can be also tilted with respect to the substrate 1. At least one of the side surfaces 101 and 102 and the upper surface 103 is formed into a rough surface. In other words, the rough surfaces can be formed on side surfaces 101 and 102 and the upper surface 103 at the same time, and the rough surface can be also only formed on any one of the side surfaces 101 and 102 and the upper surface 103. The rough surface is formed to reduce the influence of stress due to the difference in expansion coefficient between the lithium niobate film constituting the optical waveguide 2 and the protective layers 3 formed of silicon oxide, thereby reducing the light propagation loss.

Figure 4:
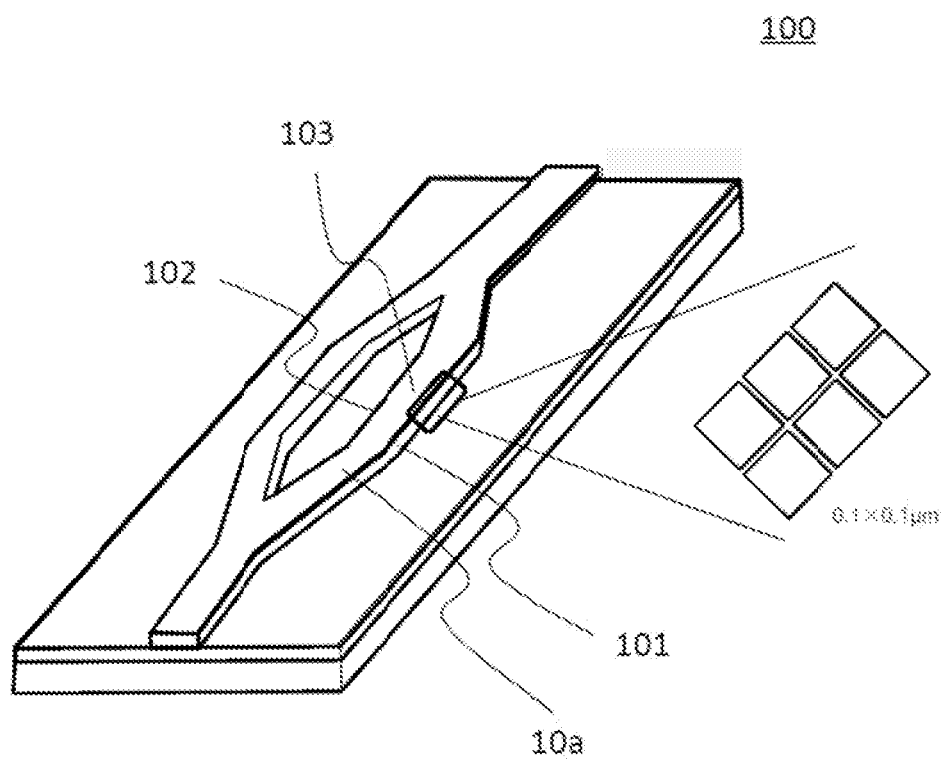
FIG. 4 is an illustrative view illustrating measuring the surface roughness RMS (root mean square) using AFM (Atomic Force Microscope) by the method of the present invention.

FIG. 4 is an illustrative view illustrating measuring the surface roughness RMS (root mean square) using AFM (Atomic Force Microscope) by the method of the present invention. As shown in FIG. 4, in the optical modulator 100 of the present embodiment, at the side surface 101 of the optical waveguides 10a and 10b, 3 locations are selected in the extension direction of the optical waveguide, and 2 locations are selected in the width direction of the optical waveguide in the range of the region of 0.1×0.1 μm, and for a total of 6 locations, the surface roughness RMS is measured with an AFM (Atomic Force Microscope), and the average of the RMS is 5.1 nm or less. In addition, regarding to side surface 102 and upper surface 103, surface roughness are measured by the same method. By measuring the surface roughness RMS at 6 points in the range of 0.1×0.1 μm, more accurate surface roughness can be acquired.

Thus, according to the optical modulator 100 of the present embodiment, by roughening at least one of the side surfaces 101 and 102 and the upper surface 103 of the optical waveguides 10a and 10b, the influence of stress due to the difference in expansion coefficient between lithium niobate and the protective layer formed of silicon oxide can be reduced, and the occurrence of micro-cracks at the optical waveguide 2 can be further suppressed, thereby reducing the light propagation loss.

Preferably, among the 6 locations, the deviation of the maximum value and minimum value of the RMS from the average is within ±1.2 nm. Thereby, the uniformity of the surface roughness can be ensured, and the occurrence of the micro-cracks at the optical waveguide 2 can be further suppressed, thus reducing the light propagation loss.

In addition, preferably, the shape of the optical waveguides 10a and 10b is a ridged shape, and the average of RMS of side surfaces 101 and 102 of the optical waveguide 10a and 10b is larger than the average of RMS of the upper surface 103 of the optical waveguide 10a and 10b. In this way, the side surfaces of the optical waveguides are further reduced from being affected by the stress of the protective layer, and the occurrence of microcracks on the optical waveguides 2 is reduced, thereby reducing the light propagation loss.

In addition, preferably, the ratio of the average of RMS of the side surfaces 101 and 102 of the optical waveguides 10a and 10b to the average of RMS of the upper surface 103 of the optical waveguide is 1.05~1.1. By adjusting the ratio in the range described above, the light propagation loss can be further reduced.

In addition, preferably, the optical waveguides 10a, 10b are epitaxial films, and the epitaxial films are orientated in a direction crossing the substrate 1, for example, oriented perpendicular to the substrate 1.

In addition, the pattern shape of the above-mentioned rough surface is not particularly limited, as long as it is a rough surface whose surface is uneven. For example, a plurality of protrusions may be formed, a plurality of dot-shaped depressions may be randomly formed, or other patterns may also be formed on the surfaces of the side surfaces 101 and 102 and the upper surface 103 of the optical waveguides 10a and 10b.

The method of forming the rough surface is not particularly limited, and a known method can be used. Hereinafter, a method of forming rough surfaces on side surfaces 101 and 102 and the upper surface 103 of the optical waveguides 10a and 10b by milling and resist patterning is described as an example.

The method of forming a rough surface by milling and resist patterning comprises a step of roughening the surface, a step of forming a resist layer on the surface, and a step of exposing the surface through a mask and removing the resist layer.

In addition, the method of forming the rough surface on the side surface of the lithium niobate film, that is the optical waveguide 2, is not limited to the above method, and the rough surface can be formed by, for example, laser etching, metal mask patterning, and RIE etching. Specifically, in the method of forming the rough surface using a laser, the surfaces of the side surfaces 101 and 102 and the upper surface 103 of the lithium niobate film, which is the optical waveguide 2, are irradiated with a laser beam and scanned back and forth, and the scanning direction is the same as the direction of the light propagation. The scanning direction runs along the side surface of the optical waveguide 2 so that elongated longitudinal stripes are formed. Metal mask patterning and RIE etching are methods in which a metal mask pattern is formed on the surfaces of the two side surfaces 101 and 102 of the lithium niobate film, which is the optical waveguide 2, and RIE etching is performed. RIE (Reactive Ion Etching) is a kind of dry etching. The principle of RIE etching is that when a high frequency voltage (RF: radio frequency) of 10 to 100 MHz is applied between plate electrodes, an ion sheath with a thickness of hundreds of microns, in which the sample is placed, is generated and the ions hit the sample at high speed to complete the chemical reaction etching.

Example

<Relation Between the Average of the Surface Roughness RMS and the Light Propagation Loss>

For the optical modulator 100 with the cross-sectional structure of the optical waveguide 2 shown in FIG. 2, the surface roughness of the side surfaces 101 and 102 of the optical waveguides 10a and 10b is changed, and the light propagation loss in the case of rough surfaces with different averages of the RMS are compared. In examples and comparative examples, only the averages of the RMS of the roughness surfaces are changed, and any other structures are the same. The average of the RMS is measured using the method illustrated in FIG. 4. The evaluation results of each example and comparative example are shown in Table 1.

TABLE 1

|  | Average of the RMS (nm) | Light propagation loss (dB) |
| --- | --- | --- |
| Example 1 | 5.1 | 12.0 |
| Example 2 | 4.3 | 10.0 |
| Example 3 | 2.9 | 11.0 |
| Example 4 | 1.7 | 9.0 |
| Comparative example 1 | 8.9 | 20.0 |

From Table 1, while the average of the surface roughness RMS is 5.1 nm or less, the light propagation loss can be suppressed to be small.

<Relation Between the Deviation of the Surface Roughness RMS and the Light Propagation Loss>

For the optical modulator 100 with the cross-sectional structure of the optical waveguide 2 shown in FIG. 2, the surface roughness of the side surfaces 101 and 102 of the optical waveguides 10a and 10b is changed, and the light propagation loss in the case of rough surfaces with different deviations of the RMS are compared. In examples, only the deviations of the RMS of the roughness surfaces are changed, and any other structures are the same. The evaluation results of each example are shown in Table 2.

TABLE 2

|  | Average of the RMS (nm) | $RMS_{max} - RMS_{ave}$ | $RMS_{ave} - RMS_{min}$ | Light propagation loss (dB) |
| --- | --- | --- | --- | --- |
| Example 11 | 1.7 | 0.6 | 0.6 | 9 |
| Example 12 | 2.9 | 0.8 | 0.7 | 11 |
| Example 13 | 4.3 | 0.9 | 1.0 | 10 |
| Example 14 | 5.1 | 1.2 | 1.2 | 12 |
| Example 15 | 8.9 | 1.6 | 1.6 | 20 |

From Table 2, while the deviations of the maximum and minimum values of the RMS of the surfaces of the optical waveguide 2 from the average is within ±1.2 nm, the light propagation loss can be further suppressed to be smaller.

<Relation Between the Ratio of the RMS of the Side Surface to the RMS of the Upper Surface and the Light Propagation Loss>

For the optical modulator 100 with the cross-sectional structure of the optical waveguide 2 shown in FIG. 2, the surface roughness of the side surfaces 101 and 102 and the upper surface 103 of the optical waveguides 10a and 10b is changed, and the light propagation loss in the case of the different roughness ratios of the upper surface to the side surface are compared. In examples, only the roughness ratios of the upper surface to the side surface are changed, and any other structures are the same. The evaluation results of each example are shown in Table 3.

TABLE 3

|  | Average of the RMS (side surface) (nm) | Average of the RMS (upper surface) (nm) | Average of the RMS (side surface)/average of the RMS (upper surface) | Light propagation loss (dB) |
| --- | --- | --- | --- | --- |
| Example 21 | 4.3 | 4.1 | 1.06 | 10 |
| Example 22 | 2.9 | 2.4 | 1.21 | 11 |
| Example 23 | 5.1 | 4.2 | 1.21 | 12 |
| Example 24 | 5.1 | 5.0 | 1.02 | 15 |

From Table 3, while the ratios of the average of the RMS of the side surface of the optical waveguide to the average of the RMS of the upper surface of the optical waveguide ([RMS (side surface)]/[RMS (upper surface)]) are set to be 1.05 or more, the light propagation loss can be further suppressed to be smaller. Also, from the viewpoint of manufacturing convenience, the ratios of the average of the RMS of the side surface of the optical waveguide to the average of the RMS of the upper surface of the optical waveguide are, for example, 1.05~1.1.

Although the present invention has been specifically described above with reference to the accompanying drawings and examples, it can be understood that the above description does not limit the present invention in any form. For example, in the above description of the optical modulator 100, it is described that the first electrode is the signal electrode and the second electrode is the ground electrode. However, it is not limited to this, the first and second electrodes can be any electrode that applies an electric field to the optical waveguide. For example, the first electrode can be a signal electrode, and the second electrode can be a ground electrode. Since the optical modulator is so-called single-driving type provided with one signal electrode, and the signal electrode as the first electrode and the ground electrode as the second electrode have symmetrical structures, so the electric fields applied to the first and second optical waveguides are equal in magnitude and opposite in sign. In addition, the embodiments of the present invention can be also suitable for various devices without electrodes.

In addition, in the above embodiment, the optical waveguide 2 is formed as a raised ridge at the surface of the substrate 1, but the formation of the optical waveguide 2 is not limited to this, it is also possible to implant ions into the substrate to form an optical waveguide, for example, doping Ti in a lithium niobate single crystal substrate to form an optical waveguide 2, and these modifications are also included in this embodiment.

In addition, in the above embodiments, an example that an optical modulator containing electrodes is given, but of course, the present invention can also be applied to an optical device provided only with optical waveguides but without electrodes, and the present invention can be also applied to arbitrary optical device which can achieve optical communication or optical measurement such as an optical switch, an optical resonator, an optical branch circuit, a sensor element, a millimeter wave generator etc. Those skilled in the art can make modifications and changes to the present invention as required without departing from the essential spirit and the scope of the present invention, and these modifications and changes all fall within the scope of the present invention.

REFERENCE NUMERAL 1 substrate
2 optical waveguide
3 protective layer
4 electrode layer
7 first electrode
8 second electrode
10 Mach-Zehnder optical waveguide
10a first optical waveguide
10b second optical waveguide
10c demultiplexing portion
10d multiplexing portion
10i input optical waveguide
10o output optical waveguide
$10_{e1}$ first straight line portion of the Mach-Zehnder optical waveguide
$10_{e2}$ second straight line portion of the Mach-Zehnder optical waveguide
$10_{e3}$ third straight line portion of the Mach-Zehnder optical waveguide
$10_{f1}$ first curved portion of the Mach-Zehnder optical waveguide
$10_{f2}$ second curved portion of the Mach-Zehnder optical waveguide
101, 102 side surface
103 upper surface

The invention claimed is:

1. An optical device, comprising an optical waveguide, wherein,
   at a surface of plate-like or film-like electro-optic material forming the optical waveguide, a surface roughness RMS is measured with Atomic Force Microscope at 6 locations, the locations forming a grid of 2 locations extending in a width direction by 3 locations extending in an extension direct, each location forming a 0.1×0.1 µm region,
   an average of the RMS is 5.1 nm or less, and
   among the 6 locations, a deviation of the maximum value and minimum values of the RMS from the average is within ±1.2 nm.

2. The optical device according to claim 1, wherein,
   a shape of the optical waveguide is a ridged shape, and
   the average of RMS of a side surface of the optical waveguide is larger than the average of RMS of an upper surface of the optical waveguide.

3. The optical device according to claim 1, wherein,
   the ratio of the average of RMS of the side surface of the optical waveguide to the average of RMS of the upper surface of the optical waveguide is 1.05~1.1.

4. The optical device according to claim 1, wherein, a metal oxide layer is provided on the optical waveguide.

5. The optical device according to claim 1, wherein, the electro-optical material is formed of $LiNbO_3$.

6. The optical device according to claim 1, wherein, the electro-optical material is material formed of $LiNbO_3$ doped with at least Ti.

7. The optical device according to claim 1, wherein, the electro-optical material is an epitaxial film.

8. The optical device according to claim 7, wherein, the epitaxial film is orientated in a direction crossing the substrate.

9. An optical modulator comprising an optical waveguide and an electrode, wherein,
   at a surface of plate-like or film-like electro-optic material forming the optical waveguide, a surface roughness RMS is measured with Atomic Force Microscope at 6 locations, the locations forming a grid of 2 locations extending in a width direction by 3 locations extending in an extension direct, each location forming a 0.1×0.1 µm region,
   an average of the RMS is 5.1 nm or less, and
   among the 6 locations, a deviation of the maximum value and minimum values of the RMS from the average is within ±1.2 nm.

10. The optical modulator according to claim 9, wherein,
    a shape of the optical waveguide is a ridged shape,
    the average of the RMS of a side surface of the optical waveguide is larger than the average of the RMS of an upper surface of the optical waveguide,
    the electrode is provided above the optical waveguide with the ridged shape.

* * * * *